(12) United States Patent
Zhang et al.

(10) Patent No.: US 9,197,946 B2
(45) Date of Patent: Nov. 24, 2015

(54) SYSTEM AND METHOD FOR AUTOMATIC CONTENT PROGRAM DISCOVERY

(75) Inventors: Zhigang Zhang, Beijing (CN); Xiaojun Ma, Beijing (CN); Ashwin S. Kashyap, Mountain View, CA (US)

(73) Assignee: Thomson Licensing, Issy les moulineaux (FR)

( * ) Notice: Subject to any disclaimer, the term of this patent is extended or adjusted under 35 U.S.C. 154(b) by 0 days.

(21) Appl. No.: 14/351,692

(22) PCT Filed: Oct. 19, 2011

(86) PCT No.: PCT/CN2011/080984
§ 371 (c)(1),
(2), (4) Date: Apr. 14, 2014

(87) PCT Pub. No.: WO2013/056436
PCT Pub. Date: Apr. 25, 2013

(65) Prior Publication Data
US 2014/0245339 A1    Aug. 28, 2014

(51) Int. Cl.
*H04N 7/16* (2011.01)
*H04N 21/8358* (2011.01)
(Continued)

(52) U.S. Cl.
CPC ....... *H04N 21/8358* (2013.01); *H04N 21/4126* (2013.01); *H04N 21/42203* (2013.01); *H04N 21/4398* (2013.01); *H04N 21/44218* (2013.01); *H04N 21/4722* (2013.01);
(Continued)

(58) Field of Classification Search
CPC ..................................... H04N 7/025
USPC ................................. 725/139, 141
See application file for complete search history.

(56) References Cited

U.S. PATENT DOCUMENTS

| | | | |
|---|---|---|---|
| 8,416,983 B1 * | 4/2013 | Joseph | 382/100 |
| 2002/0162120 A1 * | 10/2002 | Mitchell | 725/135 |

(Continued)

FOREIGN PATENT DOCUMENTS

| | | |
|---|---|---|
| CN | 1835580 | 9/2006 |
| CN | 101047833 | 10/2007 |

(Continued)

OTHER PUBLICATIONS

Megias et al.: "A Robust Audio Watermarking Scheme Based on MPEG 1 Layer 3 Compression" 13 pages. This work is partially supported by the Spanish MCYT and the FEDER funds under grant No. TIC2001-0633-CO3-03-Streamobile. Date unknown.

(Continued)

*Primary Examiner* — Olugbenga Idowu
(74) *Attorney, Agent, or Firm* — Robert D. Shedd; Ivonete Markman (57) ABSTRACT

A system for program information discovery is described. A method and a device for generating and inserting a watermark for such program information discovery into a program signal to be rendered are disclosed, along with the corresponding method and device for watermark detection and decoding from the rendered program signals. Watermark, which carries channel/program information, is encoded and embedded at the set top box where the program streams are received and decoded for rendering. Second screen devices are employed for watermark detection and decoding by capturing the render program signals which has the watermark embedded. The extracted watermark information may be sent to information servers for more detailed channel/program information.

26 Claims, 5 Drawing Sheets

(51) Int. Cl.
    *H04N 21/41* (2011.01)
    *H04N 21/422* (2011.01)
    *H04N 21/439* (2011.01)
    *H04N 21/442* (2011.01)
    *H04N 21/4722* (2011.01)
    *H04N 21/6547* (2011.01)
    *H04N 21/658* (2011.01)
    *G10L 19/018* (2013.01)

(52) U.S. Cl.
    CPC ...... *H04N 21/6547* (2013.01); *H04N 21/6582* (2013.01); *G10L 19/018* (2013.01)

(56) References Cited

U.S. PATENT DOCUMENTS

| | | | |
|---|---|---|---|
| 2010/0119208 | A1 | 5/2010 | Davis |
| 2010/0226526 | A1 | 9/2010 | Modro et al. |
| 2010/0317399 | A1 | 12/2010 | Rodriguez |
| 2012/0311623 | A1* | 12/2012 | Davis et al. .................. 725/18 |

FOREIGN PATENT DOCUMENTS

| | | |
|---|---|---|
| CN | 101102460 | 1/2008 |
| CN | 101668170 | 3/2010 |
| JP | 2005176287 | 6/2005 |
| JP | 2007174108 | 7/2007 |
| WO | WO2010054222 | 5/2010 |
| WO | WO2010127268 | 11/2010 |
| WO | WO2012092247 | 7/2012 |

OTHER PUBLICATIONS

Shekhawat et al.: "Audio Watermarking and Steganography." Date unkown, 26 pages.

Sutter, CNN Tech: My Generation iPAD app syncs with TV, Sep. 15, 2010, 2 pages.

Technolog: ABC My Generation iPAD app syncs in real time with TV, Oct. 10, 2011, 2 pages.

Tachibana et al.: "An audio watermarking method robust against time-and frequency-fluctuation" Tokyo Research Laboratory, IBM Japan. Date unknown, 12 pages.

Search report mailed Apr. 20, 2015.

\* cited by examiner

SYSTEM AND METHOD FOR AUTOMATIC CONTENT PROGRAM DISCOVERY

This application claims the benefit, under 35 U.S.C. §365 of International Application PCT/CN2011/080984 filed Oct. 19, 2011 which was published in accordance with PCT Article 21(2) on Apr. 25, 2013 in English.

TECHNICAL FIELD

The present invention generally relates to content synchronization between two devices by using digital watermarking technology. More specifically, the invention relates to content program discovery by generating and inserting watermarks into program signals to be rendered to the viewers.

BACKGROUND OF THE INVENTION

Traditionally, digital watermarking is used to enforce intellectual property rights and protect digital media from tampering. With the fast growth of various TV check-in applications, it has also been utilized to provide a mechanism to let second screen devices, such as mobile phones and Tablets, to automatically discover which channel and program is showing on the main screen device, e.g. a TV set.

For instance, there are applications that enhance the experience of watching certain TV programs by providing synchronized interactive content and social media functionality on the tablets such as an iPad. This is achieved by relying on audio watermarks that are inserted into nearly every TV program at the service provider site in the US to support Nielsen's industry standard TV audience ratings service. The watermarks, inaudible to the human ear, can be detected and decoded through the microphone of mobile devices in a normal living room setting. As soon as the audio watermark for the TV program is detected by the iPad, the corresponding application will retrieve sync-to-broadcast content from the broadcaster and show it on the tablets.

The problem with existing watermarking solutions of inserting audio watermarks at the head-end is that it is impossible to determine user interface (UI) interaction data that rely on each user's behavior, such as which programs the user has watched recently, since these data can only be learned at local devices such as the set-top-box (STB). As a result, watermark payloads in existing solutions only contain codes that identify the content's source distributor/network as well as a date/time stamp. In addition, inserting the watermarks will cause delay in the transmission of the digital data stream of the TV program because it requires re-encoding the audio data stream before transmission. This will lead to negative user experience, especially for live TV programs such as live broadcast of football games. Moreover, this kind of solution has low flexibility in that it can only be implemented by, or under close cooperation with, service providers.

The present invention solves the problem of existing solutions and proposes a content program discovery by generating and embedding watermark information in local devices.

SUMMARY OF THE INVENTION

This invention directs to methods and apparatuses for content program information discovery.

According to an aspect of the present invention, there is provided a system for program information discovery. The system comprises a set-top-box for receiving and decoding program streams into program signals, for generating and embedding a watermark on the program information into a portion of the program signals, and for sending the decoded and watermarked program signals for rendering; and a detecting device for detecting and decoding the watermark from the rendered program signals to extract program information.

According to another aspect of the present invention, there is provided a method and an apparatus for generating and inserting a watermark for program information discovery. The method comprises the steps of extracting channel/program information from a program stream; encoding said channel/program information into a watermark message; and embedding said watermark message into a signal of the program stream. The corresponding method for detecting and decoding watermark messages from a rendered program signal comprises obtaining said rendered program signal which contains a watermark signal that carries channel/program information related to the rendered program signal and that is generated and embedded after a program stream that includes the rendered program signal is received for rendering; extracting said watermark signal from the obtained program signal; and decoding said watermark signal into a watermark message to obtain the channel/program information related to the rendered program signal.

BRIEF DESCRIPTION OF THE DRAWINGS

The above features of the present invention will become more apparent by describing in detail exemplary embodiments thereof with reference to the attached drawings in which.

DETAILED DESCRIPTION

In the present invention, a solution to the discovery of content program related information is proposed, by generating and inserting such information into the program signal to be rendered in devices at the receiving end of the TV program, such as a set top box (STB). Those inserted information will be detected and decoded from the rendered program signal by at least one detecting device to extract the channel/program related information. Depending on the channel/program related information, it may be displayed directly on the detecting device or sent to information servers for more detailed information for display.

Figure 1:
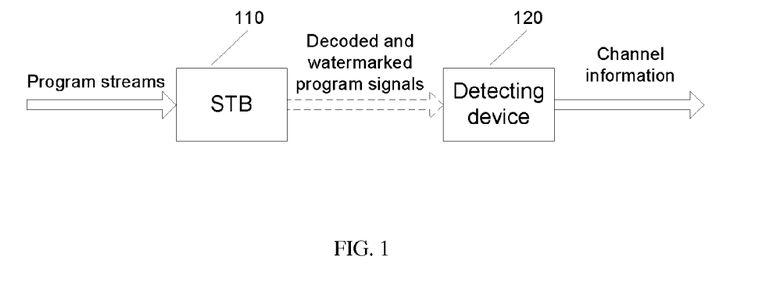
FIG. 1 shows a system for program information discovery according to the present invention.

FIG. 1 shows a system for program information discovery according to the present invention. The system comprises two major components: a step-top-box (STB) 110 and a detecting device 120. Here, the STB refers broadly to any device or software that takes media program streams as input, for example, through cable, satellite, or Internet (IP based), and decodes the program streams into signals that can be displayed on a display device. The STB receives program streams and decodes them into program signals for rendering. The STB also generates a watermark related to the received program streams and embeds the watermark into a portion of the program signals, such as a video portion, an audio portion or a portion containing both video and audio signals. The STB then sends the decoded and watermarked program signals to a display device for rendering. The detecting device obtains the decoded and watermarked portion of the program signal, for example through the rendered program signal, and detects and decodes the watermark from the obtained program signals to extract program information embedded therein. In one embodiment of the present invention, the detecting device further sends requests including the extracted program related information to an information server to retrieve more information on the content program. Such retrieved information can be sent back to the detecting device for display or another receiving device for display.

Figure 2:
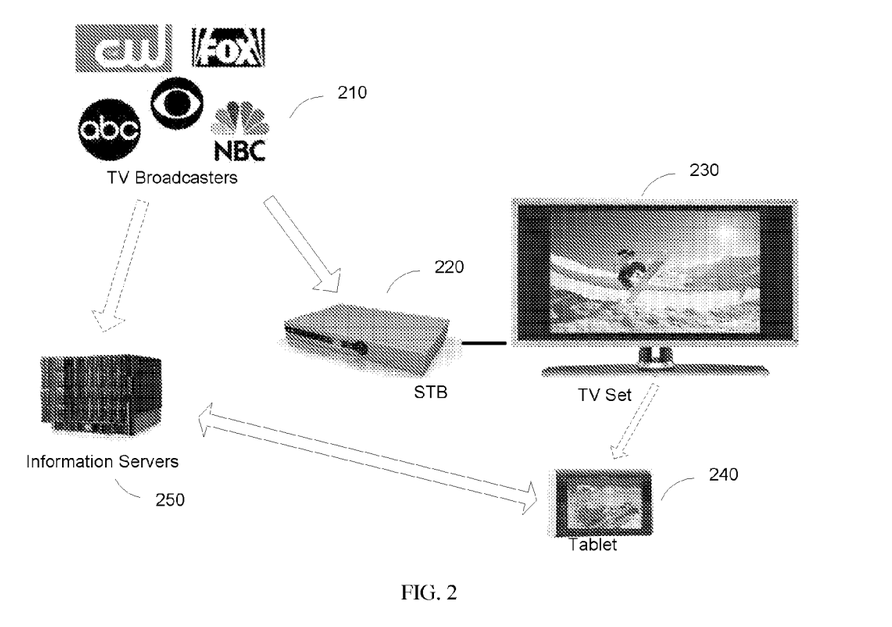
FIG. 2 shows an example system setup according to the principles of the present invention.

FIG. 2 shows an example system setup based on the present invention using audio as an example watermark carrying signal. The example system comprises the following components:

TV broadcasting companies 210, such as The American Broadcasting Company (ABC) and The National Broadcasting Company (NBC). The broadcast programs, including both video and audio content, produced by these networks are transmitted to end user, by a TV delivery mechanism such as cable or satellite.

A STB 220, which receives television program signals from the broadcasters, decodes the signals, generates and inserts audio watermark at real time and then sends the video signal and watermarked audio signal to a TV set.

A TV set 230, which is capable of receiving the audio and video signals from the STB and rendering them to the end users.

A second screen device 240 with audio input interface and network connection, such as a tablet or a smart phone. In this example, the second screen device is a detecting device and a receiving device. The device can be used by the user to detect and analyze the audio signal of the TV program, extract the embedded audio watermark, and then send the decoded channel/program information to the information servers. It can also receive the related information for the TV program from the information servers, and then present it on the device's screen for user to watch and interact.

Information servers 250, prepared by TV content providers or the third party operators, store the additional information for content programs, such as actors' introduction, link and offers. Examples of the information servers are a home gateway to serve a small area, or a dedicated server group maintained by a third party serving a large area. Once these servers receive the TV channel/program information from the second screen device, they will retrieve the program details for the channel/program by analyzing the Electronic Program Guide (EPG), and then find the related information for the specific channels, and send the information back to the second screen devices at the user side over IP network.

Figure 3:
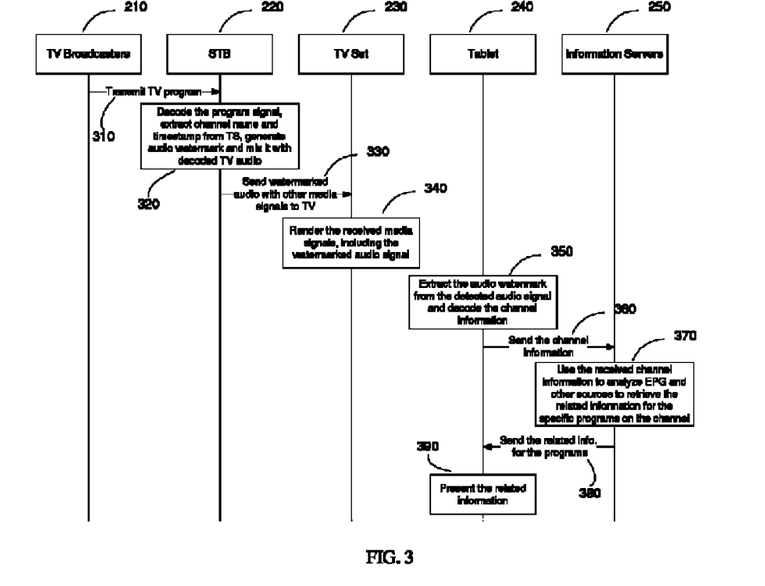
FIG. 3 shows an interaction diagram among system entities according to one embodiment of the current invention.

A typical process, in accordance with the present invention, to automatically discover the TV channel and deliver the related information for the above example system, works as follows. An interaction diagram of such a process is shown in FIG. 3.

1. A user turns on the TV set 230 and the STB 220, and then selects a channel to watch the TV program.

2. The STB 220, in step 320, receives the television program signals from the broadcasters 210, and decompresses media signals. It also generates audio watermark based on the channel/program information extracted from the transport stream (TS) and an optional secret watermark key, mixes/embeds the audio watermark signal with the TV program audio signal, and then sends the video signal and watermarked audio signal to the TV set 230. The mixing/embedding is performed periodically, or as soon as the new decoded channel name is different with the previous one, which indicates that a channel switch happened. The periodic embedding of the watermark enables the tablet to detect the watermark without too much delay, since it is impossible for the STB to predict when the tablet is on.

3. The TV set 230 renders (340) the received media signals from STB, including the watermarked audio signal.

4. If the user wants to receive related information for the program on the TV, he/she initiates a corresponding application on the tablet 240. The application receives the audio signal with the tablet's microphone, detects whether the audio watermark is present in the signal, and if so, decodes the embedded watermark message, which carries the channel/program information, using the secret watermark key if necessary (350). The application then sends (360) the channel/program information to the information servers through, for example, IP network connection.

5. As soon as the channel/program information is received from the user side, the information servers retrieve (370) the related additional information, such as links and offers for the current TV program for the specific channel, and then send it back to the tablet over the IP network (380).

6. The related information, once received from the information servers, is shown on the tablet device (390).

In the following, embodiments on the watermark generation and insertion are disclosed. In a preferred embodiment, audio signals of the program signals are employed for watermark embedding. Those skilled in the art would be able to extend the same principles to video signal or a mixture of video and audio signals for watermark embedding. For explanation purpose, the STB used in a home entertainment system is employed as an example STB; a TV set is employed as an example display device and a tablet is used as an example second screen device. It is to be understood that this invention is not limited to these examples, and extension to other types of STB, display devices and second screen devices can be achieved by one skilled in the art without departing from the scope of the invention.

Figure 4:
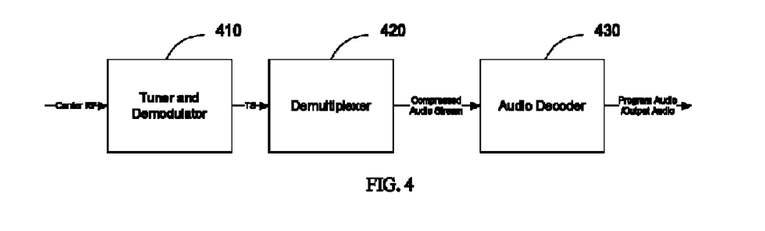
FIG. 4 shows an example block diagram of the audio signal processing portion in a set top box.

In a typical home entertainment system, a STB converts the transmitted digital media streams to signals that can be displayed on the TV set. In general, major modules in a STB for audio signal processing include, as shown in FIG. 4, a tuner and demodulator 410, an MPEG (Moving Picture Experts Group) transport stream de-multiplexer 420 and an audio decoder 430. The tuner in the STB is tuned to select one of the appropriate radio frequencies (RF) and then sends the RF signal to the demodulator. The demodulator converts the RF signal into the original signal and its output is an MPEG transport stream (TS). Then, the de-multiplexer 420 selects and decrypts the compressed audio and video for a particular program that the viewer wishes to watch. Finally, the audio decoder 430 de-compresses the compressed audio stream and converts them into a form that can be used by the audio interface in the TV set.

Figure 5:
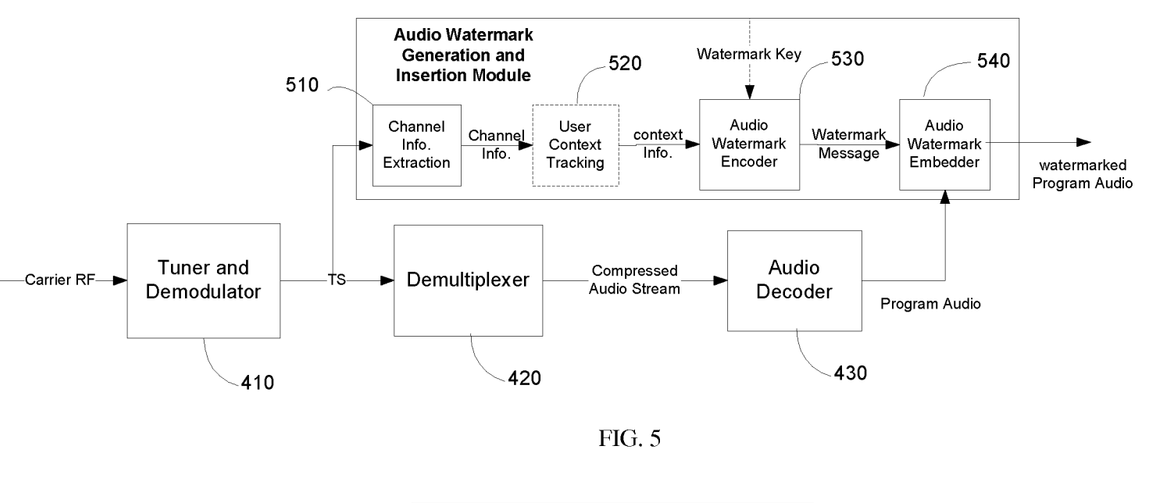
FIG. 5 shows an example block diagram of the audio signal processing portion with audio watermark generation and insertion module/unit according to one embodiment of the current invention.

In order to support program information discovery at the tablet side, a preferred embodiment of the present invention is to add an audio watermark generation and insertion module into the STB, which generates the audio watermark and mixes/embeds the watermark with the TV program audio from the audio decoder to generate a watermarked audio for the TV set to render. In one implementation, the audio watermark generation and insertion module comprises a channel information extraction unit 510, an optional user context tracking unit 520, an audio watermark encoder 530, and an audio watermark embedder 540, as shown in FIG. 5.

Those of skills in the art will appreciate that typically a program stream, such as a transport stream (TS), contains detailed information for the selected channel and program. For example, in a transport stream (TS), those information are included in a service description table (SDT), a program association table (PAT) and a program map table (PMT). Thus, the channel information extraction module/unit 510 can extract the channel/program information, such as the channel name, the channel type and the current timestamp, from the program stream obtained by the STB.

The watermark encoder 530 takes the channel/program information extracted from the channel information extraction unit 510, and encodes it into a watermark message. An optional watermark key is involved in the watermark message encoding. In applications wherein the security is a concern, for example, when the channel/program information is only accessible to subscribed users, a secret key is employed so that only authorized users can decode the watermark message. In scenarios where the channel/program information or the watermark message is open to everyone that can receive the watermarked audio signal, no secret key is needed during watermark message encoding. In one implementation, the watermark encoder 530 encodes and outputs the watermark message when a predetermined time limit is reached, e.g. 10 seconds, or if the channel/program information changes.

Finally, the audio watermark embedder 540 embeds the watermark message into the audio portion of the program stream, e.g. the decompressed program audio. In a different implementation, the watermark message can also be embedded in a compressed program stream. In general, the audio watermark should be embedded such that it is not perceivable by observers, but is robust against unintentional or anticipated manipulations, such as compression, filtering, re-sampling, re-quantization, cropping, scaling, and environment noise caused by people talking or telephone ringing etc. Example watermark embedding schemes can be found in, for example, R. Tachibana, S. Shimizu, T. Nakamura, and S. Kobayashi, "*An audio watermarking method robust against time-and frequency-fluctuation,*" in *Proc. of SPIE Int. Conf. on Security and Watermarking of Multimedia Contents III,* 4314, pp. 104-115, San Jose, USA, January 2001 and Megias, D., Herrera-Joancomarti, J., Minguillon, J.: *A robust audio watermarking scheme based on MPEG 1 layer 3 compression*", in *CMS* 2003. *LNCS* 963, Springer-Verlag (2003) pp. 226-238.

Figure 6:
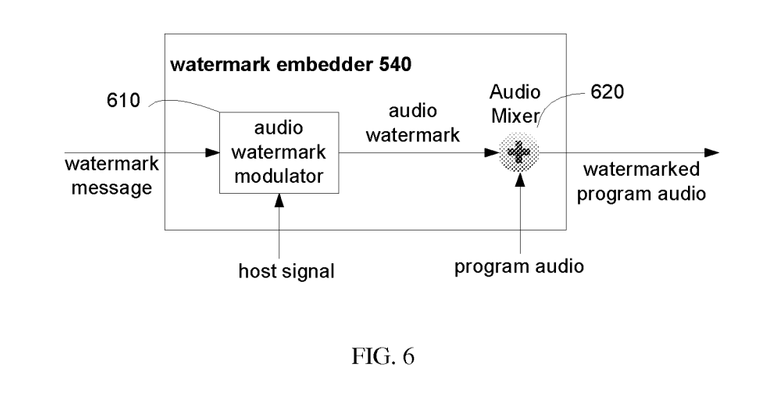
FIG. 6 shows a preferred embodiment of the watermark embedder module/unit.

FIG. 6 shows a preferred embodiment of the watermark embedder 540 which comprises an audio watermark modulator 610 and an audio mixer 620. The audio watermark modulator 610 modulates a host signal using the watermark message to generate an audio signal. The host signal is in a low frequency range and pattern, unperceivable to the human ear but can be picked up by the Tablet's audio input interface and decoded by the Tablet. For example, the host signal can be an 18-22 KHz audio signal which is imperceptible to humans according to Anirudh Shekhawat, Manan Shah, Prateek Srivastava and Pratik Poddar, "*Audio Watermarking and Steganography*". The host signal can be dependent on or independent of the program audio that will be carrying the watermark. Then the generated audio watermark signal is mixed, by the audio mixer 620, with the program audio signal to construct the watermarked program audio signal. One implementation of such a mixing is to simply add the watermark signal and the program audio signal together. The watermarked program audio are then sent to the TV set audio interface for rendering.

In a different embodiment of the present invention, the optional user context tracking module/unit 520 is employed. The user context is a temporarily defined environment of the behavior of watching TV, such as the relevant TV watching history and user interaction with STB for the particular viewer. Possible information in the user's context that can be tracked by the tracking unit 520 is:

Recent list of channels/programs watched by the user.
Play/pause information if the user is watching time shifted content.
Other interactions with the STB.

In one implementation, the user context tracking module/unit 520 keeps a list of recently watched channel/program names along with the corresponding timestamps when the user first tuned into the channel. For example, if it is defined that the list contains 4 latest watched channels and their corresponding tuning-in timestamp, an original user context information list can be in the following format:
NBC 20050730151820 CNN 20050730161921 ABC 20050730182230 KTYU 20050730201916

The timestamp for NBC, 20050730151820, indicates the time when the user tuned into NBC is 15:18:20 on Jul. 30, 2005. By using the user context information as the watermark, the information on the history of the watched channel is kept, which can be used to study the habit of user. Such history information can be stored on the STB, and when the tablet is turned on, these information will be sent to the tablet through watermark and is further sent to information servers to retrieve relevant information. Without such user context based watermark, the history of the watched channel/program will get lost and the information sent to the tablet and information servers will be limited to the current channel/program being watched.

In order to reduce the bit rate for encoding watermarks, this list will be encoded with the following methods:

Encode the channel name with arithmetic coding or other entropy encoding methods. Those skilled in the art would appreciate that entropy encoding is a lossless data compression scheme and the arithmetic coding is one of the most common entropy encoding methods. Specifically, instead of encoding every channel name with the same number of bits, arithmetic encoding or other entropy encoding technique encodes the names of the frequently watched channels with fewer bits and the name of not-so-frequently watched channels with more bits, resulting in fewer bits used in total. For example, we can encode the popular channels into 4-bit code words, such as representing NBC using 0001, while encode the local channels into 8-bit code words, such as representing KTVU using 0000 0001. Such an encoding can be static or dynamic. In static encoding, the number of bits and the code word for each channel is predetermined and fixed, while in dynamic encoding, such information is updated based on the statistics collected in real time. For example, the STB starts to collect the statistics on the channels being watched and build a distribution of the frequency at the new installation or upon resetting. The distribution is being updated from time to time. The updated statistics will be used to perform the encoding of the channel/program information.

Encode the timestamp for the first watched channel/program in the list with the absolute time, while encode the timestamp for other channels/programs in the list with the offset value relative to the first channel's timestamp.

After receiving the decoded channel name from the channel information extraction module, the user context tracking module 520 will compare the name with the latest channel name in the user context information list to see whether or not they are different. If they are different, the module will append the new channel name with the corresponding timestamp into the list. On the other hand, it they are the same, the module will keep the user context information list unchanged. The audio watermark encoder 530 takes the user contextual information as input when generating the watermark message.

Figure 7:
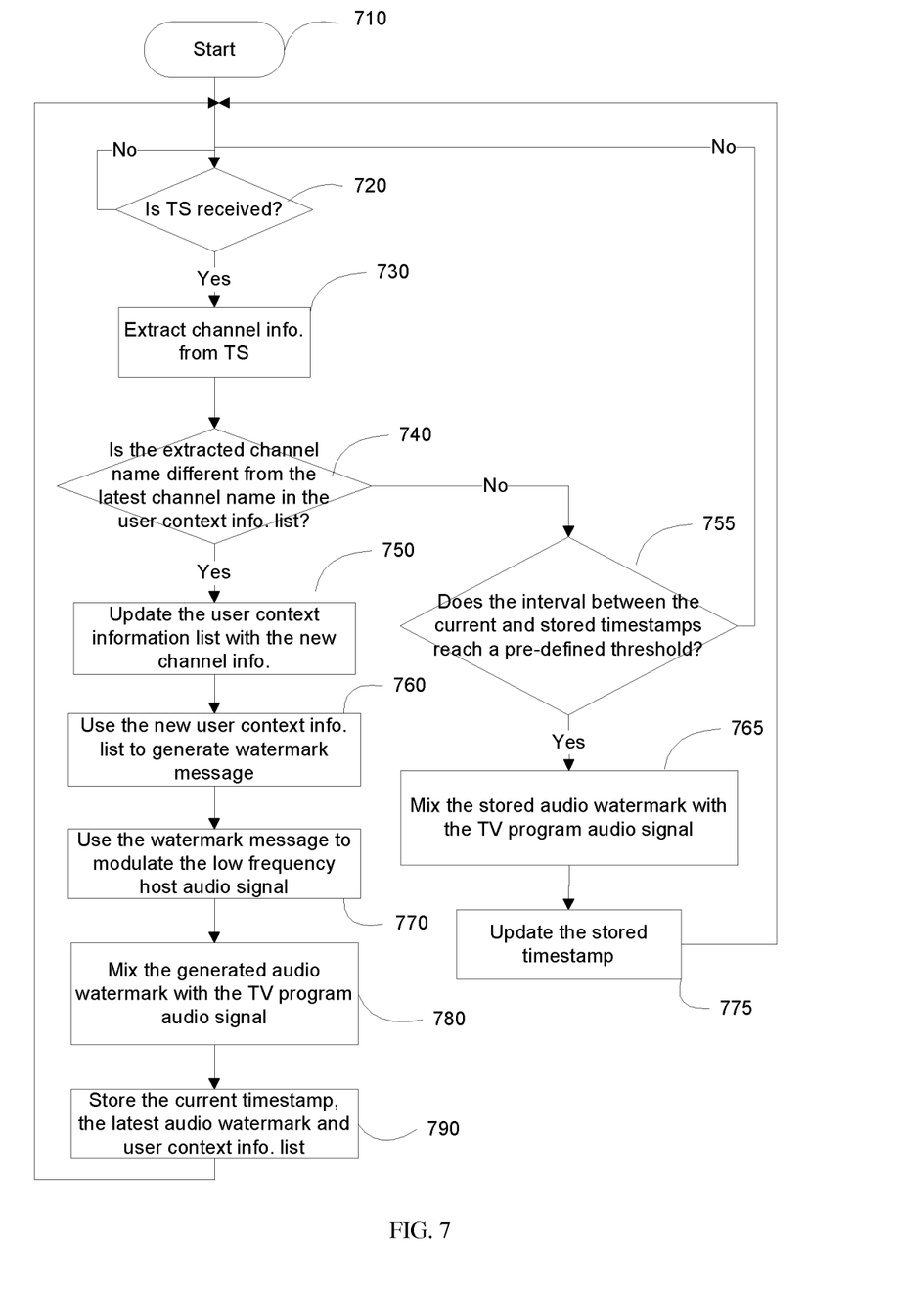
FIG. 7 shows a flow chart of the audio watermark generation and insertion process according to one embodiment of the present invention.

FIG. 7 shows a detailed flow chart of the audio watermark generation and insertion module according to one embodiment of the present invention. The process starts at step 710 and waits until a transport stream (TS) is received at step 720. Step 730 extracts the channel/program information, such as the channel name and the timestamp, from the TS. The extracted channel/program information is compared with the latest channel/program information at step 740 to see if there are any changes on the channel name. If yes, the user context information list is updated in step 750 with the new channel/program information. Such an updated user context information list is used to generate the watermark message at step 760. The generated watermark message is then used to modulate a low frequency host signal in step 770. The modulated signal is then mixed/embedded with the program audio signal decoded from the audio stream in the same TS in step 780. Step 790 stores the current timestamp, the latest audio watermark and the user context information list, and then the process proceeds to step 720. If it is determined at step 740 that the channel name in the extracted channel/program information is the same as the channel name in the latest channel/program information, step 755 further decides if the time interval between the current timestamp and the stored timestamp reaches a pre-determined threshold/time limit, e.g. 10 seconds although other time periods are equally feasible. If not, the process proceeds to step 720. If yes, step 765 embeds/mixes the stored watermark with the program audio signal decoded from the audio stream in the received TS. The stored timestamp is updated with the current timestamp in 775 and the process then proceeds to step 720.

Figure 8:
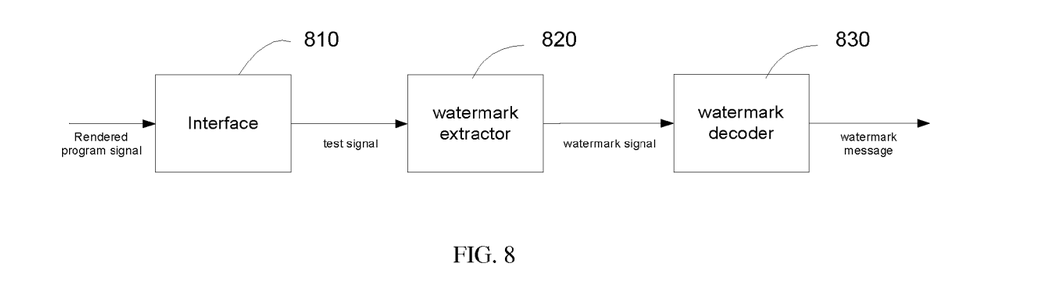
FIG. 8 shows a block diagram of a module/unit for watermark detection and decoding.

FIG. 8 shows a module/unit, implemented on the second screen device 240, for detecting and decoding watermark messages from the rendered program signal which contains the embedded watermark. This module/unit comprises an interface 810 for obtaining the rendered program signal, a watermark extractor 820 for extracting the watermark signal from the obtained test program signal, and a watermark decoder 830 for decoding said watermark signal into a watermark message that contains the channel/program information. The interface 810 may comprise a microphone and/or a camera. If the rendered program signal that contains the watermark comprises an audio signal, the interface 810 would employ a microphone to record the audio signal. When the rendered program signal that contains the watermark comprises a video signal, the interface 810 would employ a camera to capture the video images. Combinations of audio and video detection are also possible.

In one embodiment, the second screen device keeps the interface microphone or camera on, and feeds the received signal into the watermark extractor and detector modules to detect and decode the channel/program information all the time. The second screen device will track the latest decoded channel/program information, and compare, for example, the channel name decoded in current time with the channel name detected at a previous time. If they are different, it will send the latest channel code to information servers to retrieve the related information for the new channel or simply update the display of the channel information on the second screen device, as the case may be.

Although preferred embodiments of the present invention have been described in detail herein, it is to be understood that this invention is not limited to these embodiments, and that other modifications and variations, such as to provide similar content synchronization between two devices through watermark, may be effected by one skilled in the art without departing from the scope of the invention as defined by the appended claims.

The invention claimed is:

1. A system for using program information comprising:
a receiver for receiving and decoding program streams into program signals, for generating and embedding a program information watermark into a portion of the program signals, and for sending the decoded and watermarked program signals for rendering, wherein said program information watermark includes user context comprising a list of programs watched; and
a detecting device for detecting and decoding the program information watermark from the rendered program signals.

2. The system of claim 1, wherein the detecting device further sends requests using the detected watermark to an information server for program information.

3. The system of claim 1, wherein the watermark is embedded into an audio portion of the program signals.

4. The system of claim 1, wherein the watermark is embedded into a video portion of the program signals.

5. The system of claim 1, wherein the detecting device is a tablet.

6. A method for generating and inserting a program information watermark, the method comprising:
extracting program information from a program stream;
tracking user context comprising a list of programs watched;
incorporating the program information and user context into a watermark message; and
encoding said program information into a watermark message; and
embedding said watermark message into a signal of the program stream.

7. The method of claim 6, wherein embedding further comprises:
modulating said watermark message with a host signal to obtain a watermark signal; and
embedding said watermark signal into said signal of the program stream.

8. The method of claim 6, further comprising:
updating the watermark message when at least one of a time limit is reached and the program information changes.

9. The method of claim 6, wherein the watermark message is embedded into an audio signal of the program stream.

10. The method of claim 6, wherein the watermark message is embedded into a video signal of the program stream.

11. An apparatus for generating and inserting a program information watermark, the apparatus comprising:
- a channel information extractor for extracting program information from a program stream;
- a user context tracker for tracking user context comprising a list of programs watched;
- a watermark encoder for encoding incorporating said program information and user context into a watermark message; and
- a watermark embedder for embedding said watermark message into a signal of the program stream.

12. The apparatus of claim 11, wherein the watermark embedder comprises:
- a watermark modulator for modulating said watermark message with a host signal to obtain a watermark signal; and
- a mixer for mixing said watermark signal with the signal of the program stream.

13. The apparatus of claim 11, wherein the watermark encoder updates the watermark message when at least one of a time limit is reached and the program information changes.

14. The apparatus of claim 11, wherein the watermark embedder embeds the watermark message into an audio signal of the program stream.

15. The apparatus of claim 11, wherein the watermark embedder embeds the watermark message into a video signal of the program stream.

16. A method for detecting and decoding watermark messages from a rendered program signal, the method comprising:
- obtaining said rendered program signal which contains a watermark signal that carries program information related to the rendered program signal and user context comprising a list of programs watched, and that is generated and embedded after a program stream that includes the rendered program signal is received for rendering;
- extracting said watermark signal from the obtained program signal; and
- decoding said watermark signal into a watermark message to obtain the program information related to the rendered program signal and the user context.

17. The method of claim 16, wherein obtaining comprises recording an audio signal from said rendered program signal.

18. The method of claim 16, wherein obtaining comprises recording a video signal from said rendered program signal.

19. An apparatus for detecting and decoding watermark messages from a rendered program signal, the apparatus comprising:
- an interface for obtaining said rendered program signal which contains a watermark signal that carries program information related to the rendered program signal and user context comprising a list of programs watched, and that is generated and embedded after a program stream that includes the rendered program signal is received for rendering;
- a watermark extractor for extracting said watermark signal from the obtained program signal; and
- a watermark decoder for decoding said watermark signal into a watermark message to obtain the program information related to the rendered program signal and the user context.

20. The apparatus of claim 19, wherein the interface is a microphone which obtains said rendered program signal by recording an audio signal thereof.

21. The apparatus of claim 19, wherein the interface is a camera which obtains said rendered program signal by recording a video signal thereof.

22. A method for using program information comprising:
- receiving and decoding by a receiver program streams into program signals, for generating and embedding a program information watermark into a portion of the program signals, and for sending the decoded and watermarked program signals for rendering, wherein said program information watermark includes user context comprising a list of programs watched; and
- detecting and decoding by a detecting device the program information watermark from the rendered program signals.

23. The method of claim 22 further comprising:
- sending requests using the detected watermark from the detecting device to an information server for program information.

24. The method of claim 22, wherein the watermark is embedded into an audio portion of the program signals.

25. The method of claim 22, wherein the watermark is embedded into a video portion of the program signals.

26. The method of claim 22, wherein the detecting device is a tablet.

* * * * *